W. CRANDELL.
Wheels for Vehicles.

No. 147,611. Patented Feb. 17, 1874.

Witnesses:

Inventor.

UNITED STATES PATENT OFFICE.

WILLIAM CRANDELL, OF WESTFIELD, NEW YORK.

IMPROVEMENT IN WHEELS FOR VEHICLES.

Specification forming part of Letters Patent No. 147,611, dated February 17, 1874; application filed July 3, 1873.

*To all whom it may concern:*

Be it known that I, WILLIAM CRANDELL, of Westfield, in the county of Chautauqua and in the State of New York, have invented certain new and useful Improvements in Hubs; and do hereby declare that the following is a full, clear, and exact description thereof, reference being had to the accompanying drawings, and to the letters of reference marked thereon, making a part of this specification.

The nature of my invention consists in the construction and arrangement of a hub for wheels of vehicles, as will be hereinafter more fully set forth.

In order to enable others skilled in the art to which my invention appertains to make and use the same, I will now proceed to describe its construction and operation, referring to the annexed drawing, in which—

Figure 1:
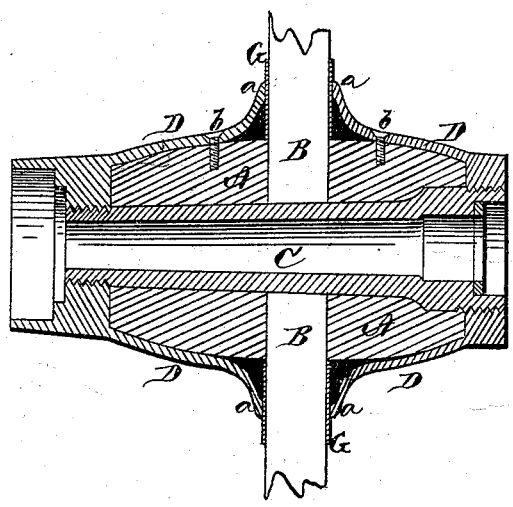
Figure 2:
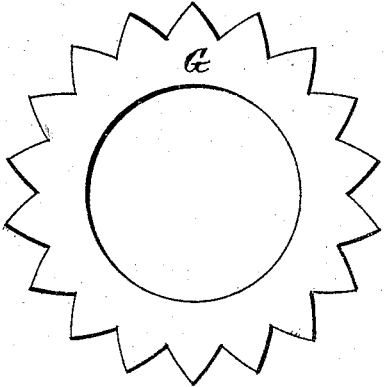

Figure 1 is a longitudinal vertical section of my hub, and Fig. 2 shows one of the washers used in the same.

A represents an ordinary mortised wooden hub, into which the tenoned spokes B B are driven in the usual manner. C represents the axle-box, inserted through the wooden hub A, and projecting beyond both ends of the same. Both projecting ends of the axle-box C are provided with screw-threads around the outside, as shown in the drawing, and upon each end is screwed a case, D, which extends up over the wooden hub, the inner end $a$ of the case bearing against an index-washer, G, and these washers against the spokes B B. The washers G G are made of sheet metal, fitting over the wooden hub A close up against the spokes, and have V-shaped projections around their outer edges, as shown in Fig. 2, the number of such projections corresponding with the number of spokes, so that each spoke will have one of these projections on each side. The wooden hub A is thus completely inclosed within the cases D D, which, with the index-washers G G, support the spokes of the wheel. To prevent the cases D D from unscrewing or coming loose, a hole is drilled in each case, and a screw, $b$, is passed through the same into the wooden hub, as shown.

By the construction of this wheel, grease or oil is entirely prevented from getting to the hub and spokes. It is impossible by an overstrain of the wheel to dislocate the spokes and washers so as to make the wheel untrue. If the spokes shrink they can be tightened by drawing out the screws $b$, and turning the cases D with a wrench.

Having thus fully described my invention, what I claim as new, and desire to secure by Letters Patent, is—

The combination of the wooden hub A, the metallic casings D D, made in two parts and having female screw-threads at their outer ends, and secured to the hub A by the bolts or screws $b$ $b$, the box C, with male screw-threads at each end, the index-plates G G, and the spokes B B, all constructed and arranged substantially as set forth.

In testimony that I claim the foregoing I have hereunto set my hand this 6th day of May, 1873.

WILLIAM CRANDELL.

Witnesses:
WM. H. WILSON,
A. B. HUFF.